US008642926B2

(12) United States Patent
Kochems et al.

(10) Patent No.: US 8,642,926 B2
(45) Date of Patent: Feb. 4, 2014

(54) ELECTRIC HEATING SYSTEM, IN PARTICULAR FOR USE AS AN AUXILIARY HEATING SYSTEM FOR AUTOMOBILES

(75) Inventors: Jürgen Kochems, Ditzingen (DE); Michael Edgar Luppold, Dettenheim-Lie (DE); Rolf Merte, Heidelberg (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 1388 days.

(21) Appl. No.: 11/985,931

(22) Filed: Nov. 19, 2007

(65) Prior Publication Data

US 2008/0135536 A1 Jun. 12, 2008

(30) Foreign Application Priority Data

Nov. 23, 2006 (DE) ........................ 10 2006 055 872

(51) Int. Cl.
*B60L 1/00* (2006.01)

(52) U.S. Cl.
USPC ............................ 219/202; 219/208; 219/530

(58) Field of Classification Search
USPC ................. 219/202, 530, 540, 520, 539, 208; 392/347, 355; 165/80.3, 149–151, 165/DIG. 499, 173
See application file for complete search history.

(56) References Cited

U.S. PATENT DOCUMENTS 2,019,967 A * 11/1935 Hoesel ....................... 165/134.1
3,031,171 A * 4/1962 Buttner ......................... 165/182
5,057,672 A * 10/1991 Bohlender et al. ............ 219/540
5,192,853 A * 3/1993 Yeh .............................. 219/540
6,124,570 A 9/2000 Ebner et al.
6,392,207 B2 * 5/2002 Beetz et al. .................... 219/530
6,810,203 B2 * 10/2004 Alban et al. .................. 392/347
6,875,962 B2 4/2005 Uhl et al.
2003/0180033 A1 * 9/2003 Alban et al. .................. 392/347
2004/0112884 A1 6/2004 Uhl et al.
2005/0072774 A1 * 4/2005 Bohlender .................... 219/548

FOREIGN PATENT DOCUMENTS

DE 199 02 050 A1 9/1999
DE 203 12 313 U1 12/2004
WO WO 02/057100 A2 7/2002

OTHER PUBLICATIONS

Eichenauer, DE20312313 machine ranslation, Accessed from http://www.epo.org on Apr. 20, 2011.*

* cited by examiner

*Primary Examiner* — Henry Yuen
*Assistant Examiner* — John Wasaff
(74) *Attorney, Agent, or Firm* — Hackler Daghighian & Martino

(57) ABSTRACT

An electric heating system, in particular an auxiliary heating system in automobiles, in which the heating system has several heating rods (1), arranged side-by-side; the heating rods (1) are connected to each other by means of alike metal plates (4) that are slid onto the heating rods (1); the heating rods (1) have for this purpose a series of slotted holes (3) that extend in the longitudinal direction (10) of the metal plates (4); the slotted holes (3) have longitudinal edges, facing each other, that clamp the heating rods (1) between them; and at least one part of the slotted holes (3) in each metal plate (4) is longer by more than the manufacturing tolerance, than the width of the heating rods (1) measured in the longitudinal direction (10) of the metal plates (4).

22 Claims, 2 Drawing Sheets

ELECTRIC HEATING SYSTEM, IN PARTICULAR FOR USE AS AN AUXILIARY HEATING SYSTEM FOR AUTOMOBILES

The invention relates to an electric heating system. Such a heating system is used especially as an auxiliary heating system for automobiles. As a rule, automobile heating systems utilize the waste heat produced by the combustion engine. The continuous increase of the efficiency of combustion engines, however, has resulted in a reduction of the amount of waste heat available for the heating system. This applies in particular to the direct-injection diesel engines especially designed for fuel economy. Because of their reduced waste heat, these engines do not, especially in winter, heat up as rapidly as would be desirable for the defrosting of the front windshield, to prevent fogging up of the front windshield and to heat up the passenger compartment to a comfortable temperature. Because of this reason, it is known from U.S. Pat. No. 6,124,470 to provide an electric auxiliary heating system, presenting typically an output between 250 Watts and 2000 Watts.

From U.S. Pat. No. 6,875,962 an electric auxiliary heating system is known which comprises several heating rods, in which PTC resistances are provided as heating resistances. A number of plates are slipped upon the heating rods, whereby the rods are connected to each other. For this purpose, the plates are provided with rectangular openings, of which their inner width is closely adapted to the cross-section of the heating rods, so that the edges of the openings grip the heating rods. These plates function as heat exchangers. The heating rods transfer the therein produced heat to the plates which convey it to an air flow that passes transversally through the auxiliary heating system. One of the extremities of the heating rods is inside a housing in which is arranged a control circuit with power semiconductors, which circuit controls the heating current for the heating rods. Further, either inside or at the housing is arranged a metal plate by means of which is established a bonding with the outside of the heating rod. The other ends of the heating rods are inserted in a cross-arm that mechanically stabilizes the auxiliary heating system and presents means for the assessing of the auxiliary heating system in the motor vehicle.

For different motor vehicles there are different auxiliary heating systems which can be differentiated according to the type and arrangement of the heating rods as well as according to the type of the metal plates adapted to the heating rods.

SUMMARY OF THE INVENTION

The object of the present invention is to rationalize the manufacture of electric auxiliary heating systems for different automobiles.

This object is achieved by means of a heating system with the characteristics set forth in claim 1. Other favorable embodiments of the invention are the subject-matter of the subclaims.

According to the invention, at least part of the slotted holes in each metal plate, namely the same slotted holes in each metal plate, is longer by more than the manufacturing tolerance, than the width of the heating rods measured in the longitudinal direction of the metal plates.

This has the advantage that the heating rods can be transversally displaced in the elongated slotted holes, whereby the distance between the heating rods can be changed. This allows to use the same embodiment for the configuration of different auxiliary heating systems that differ in the distance between their heating rods.

Therefore, with respect to prior art, it is possible to reduce the number of different metal plates previously required, thus obtaining a rationalization effect that reduces the cost of manufacture, of the tools required for the manufacture as well as of the stock-keeping of the metal plates.

The elongated slotted holes are preferably 1.5 times as long, even better at least twice as long as the width of the widest heating rods, and not more than four times as long as the width of the widest heating rods. Thus, there is considerable play for the configuration of electric auxiliary heating systems with heating rods that differ with respect to the distances between them and/or to their width.

At least in the case of heating systems that have an even number of heating rods all slotted holes are preferably elongated according to the invention. In the case of an odd number of heating rods it can be disregarded to elongate the central slotted hole because, even with different heating rod distances, the middle heating rod can continue in the same central position.

In the case of an even number of heating rods, the middle slotted holes, namely, the slotted holes for the two central heating rods, can be shorter than the slotted holes for the outer heating rods. In the case of a heating system with four adjacent heating rods it is favorable if the outer slotted holes, namely, the slotted holes for the outer heating rods, are twice the length of the slotted holes for the inner heating rods. This allows that heating rods with distinctly different widths can be inserted into such configured metal plates at equal distances.

The metal plates are advantageously configured either planar or mainly planar. In the slotted holes, tongues form at least on one side of the pertinent slotted hole its longitudinal edge. The tongues can extend along the plane of the metal plates. Preferably, the tongues are all bent off from the plane of the metal plates in the same direction. This facilitates the slipping of the metal plates onto the heating rods that bend the metal plates, so that, because of a springing back of their tongues, the metal plates clamp the heating rods in the slotted holes, i.e. establish a frictional connection with the heating rods. Not only is such a frictional connection favorable for the cohesion of the auxiliary heating system but also for the heat transfer from the heating rods to the metal plates.

In principle, in the slotted holes are not required several tongues in order to establish the frictional connection with the heating rods. By providing several tongues it is possible, however, to obtain a constant cohesion irrespective of the position of the pertinent heating rods in the slotted holes and to obtain a greater rigidity of the metal plates. Especially favorable in this respect is a width of the tongue that corresponds approximately to the average width of the customary heating rods with PTC heating elements. Preferably, the heating rods have a rectangular cross-section.

The metal plates can be out of a sufficiently heat-resisting synthetic material. Preferably, they are made out of sheet metal. This has the advantage that they can be manufactured at low cost as stamped and bent parts and can facilitate a good heat transfer. Furthermore, the metal plates can concomitantly be used to establish a connection to ground. For this purpose, an extra hole is punched into the metal plates, into which a metal bolt, serving as terminal post for the connection to ground, can be inserted into one of the metal plates. As an alternative, the metal plates can also be provided with a connecting lug for the establishing of a connection to ground.

BRIEF DESCRIPTION OF THE DRAWINGS

The hereto attached illustrations show an embodiment of the invention.

DETAILED DESCRIPTION

Figure 1:
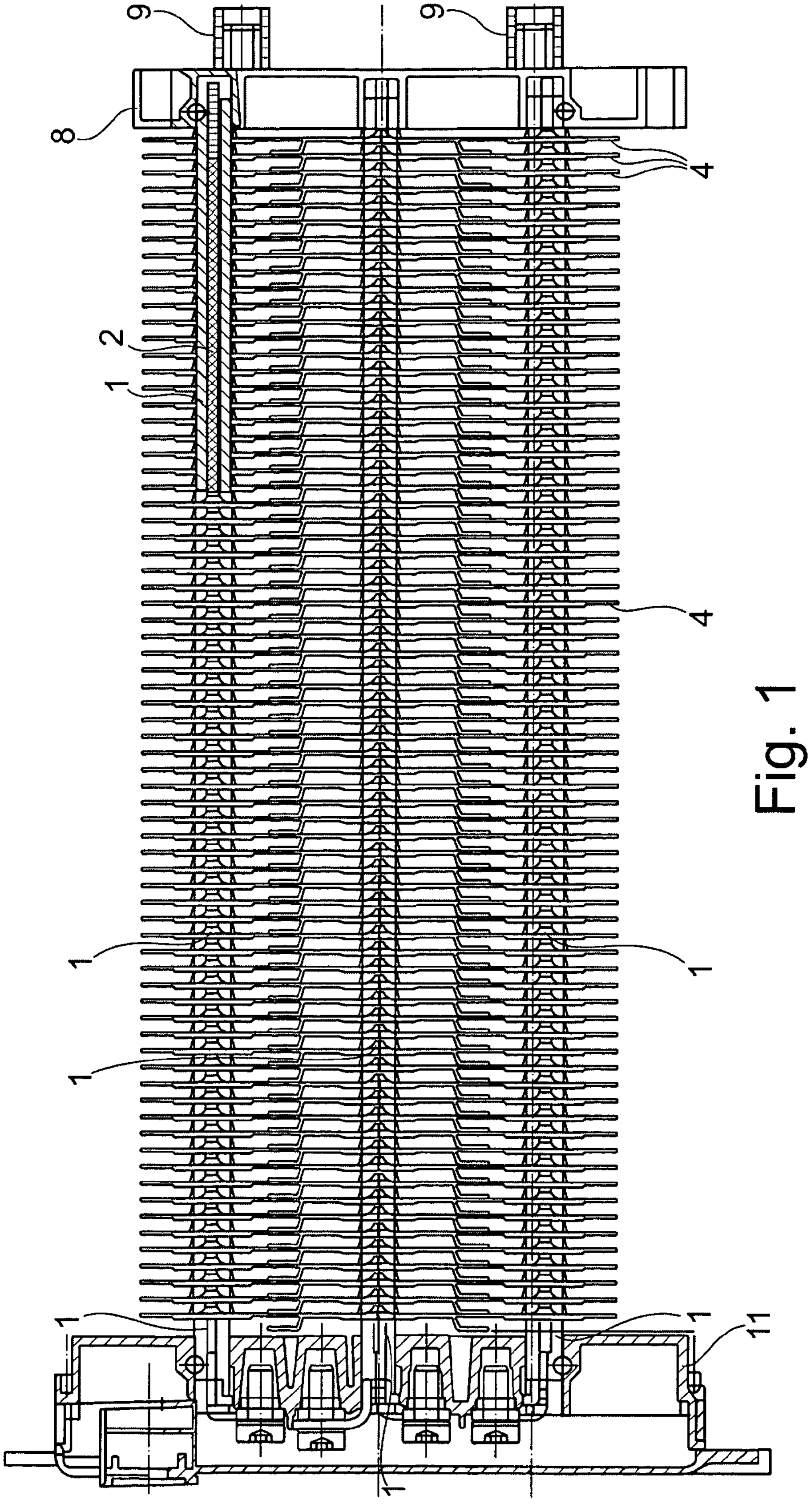
FIG. 1 shows a lateral view and a partly sectional view of an electric auxiliary heating system
Figure 2:
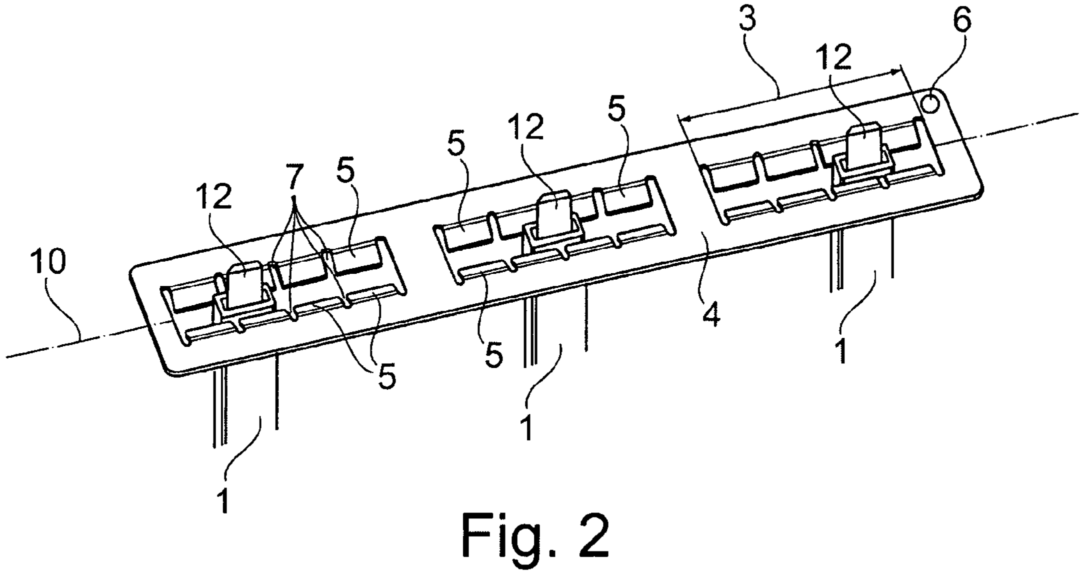
FIG. 2 shows a diagonal view an assembly of a metal plate and three heating rods and FIG. 3 shows a top view of the assembly of FIG. 2
Figure 3:
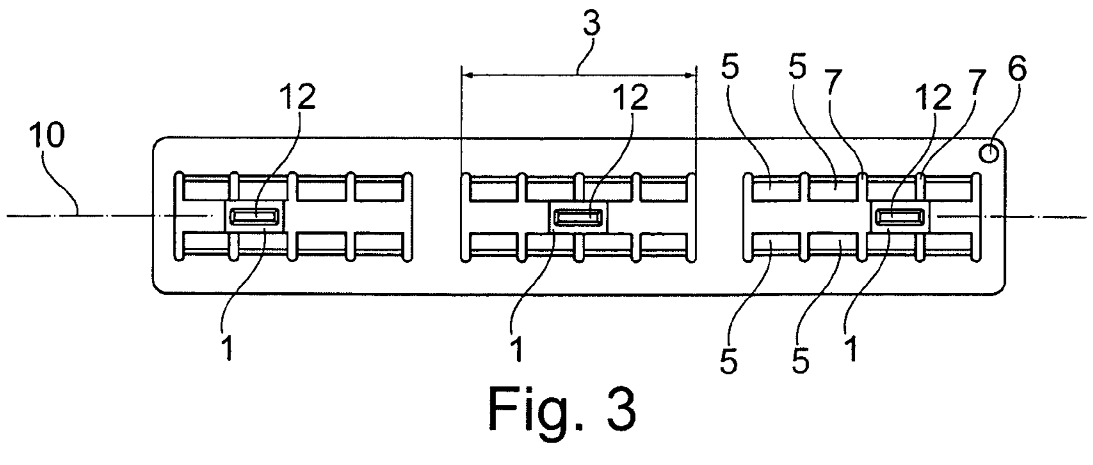

The auxiliary heating system shown in FIG. 1 comprises three heating rods 1 that are provided with PTC heating elements 2. One of the extremities of the heating rods 1 is inserted in a housing 11 of a control circuit, which supplies the power to the heating rods 1. Feed lines 12 to the PTC heating elements 2 protrude from the extremities of the heating rods 1, which are inserted in the housing 11. The other extremities of the heating rods 1 are inserted in a cross-arm 8 bearing sockets 9 for the attaching of the heater to a mounting that is provided in the vehicle. Metal plates 4 are slipped at regular intervals over the heating rods 1. As shown in FIGS. 2 and 3, the metal plates 4 are provided for this purpose with three slotted holes 3 that are approximately four times as long as the width of the heating rods 1, and extend longitudinally in the longitudinal direction 10 of the metal plates 4. Each of the longitudinal edges of the slotted holes 3 is provided with four tongues 5 that face each other in pairs, and which are bent off from the plane of the metal plates 2. The tongues 5, facing each other in pairs, are at a distance from each other that is less than the thickness of the heating rods 1, so that the metal plates 2 are clamped on the heating rods 1. Thus, the tongues 5 are separated from each other by transversely running recesses 7.

Due to the chosen length of the slotted holes 3, the distance between the heating rods vis-à-vis the illustrated assembly can be lengthened by the width of the heating rods 1 or shortened by twice the width of the heating rods 1.

At one corner of the metal plate 2 is provided an additional hole 6 into which can be inserted a bolt (not shown) for grounding the system.

REFERENCE NUMBERS LIST

1 Heating rods
2 PTC heating elements
3 Slotted holes
4 Metal plates
5 Tongues
6 Additional hole
7 Recesses
8 Cross-arm
9 Bearing socket
10 Longitudinal direction of the metal plates 1 and of the slotted holes 3
11 Housing
12 Feed line

What is claimed is:

1. An electric heating system for use in automobiles, the system comprising:
- a plurality of side-by-side heating rods each comprising a PTC heating element;
- a plurality of rod connecting plates;
- a series of sequentially aligned slotted holes formed in each of the plurality of rod connecting plates disposed along a longitudinal length of the rod connecting plates and configured for receiving the side-by-side heating rods, each slotted hole having a length extending longitudinally along each of the plurality of rod connecting plates, at least some of the slotted hole lengths being greater than each heating rod width configured for enabling a distance between heating rods to be changed; and
- a plurality of tongues formed along an inside perimeter of each of the slotted holes and facing each other, the plurality of tongues configured for clamping the heating rods therebetween.

2. A heating system according to claim 1, wherein the longer slotted holes are at least 1.5 times as long as a width of a widest clamped heating rod.

3. A heating system according to claim 1, wherein the longer slotted holes are at least twice as long as a width of the widest clamped heating rod.

4. A heating system according to claim 1, wherein all the slotted holes are longer than a width of the clamped heating rods.

5. A heating system according to claim 1, wherein the plates have an odd number of slotted holes and all the slotted holes, except a centered slotted hole, are longer than a width of the clamped heating rods.

6. A heating system according to claim 1 comprising an even number of heating rods, and wherein the slotted holes for two middle heating rods are longer than a width of the clamped heating rods and shorter than the slotted holes for outer clamped heating rods.

7. A heating system according to claim 6, wherein the slotted holes for the clamped outer heating rods are twice as long as the slotted holes for the clamped inner heating rods.

8. A heating system according to claim 1, wherein the slotted holes are no more than four times as long as the width of the widest disposed heating rod.

9. A heating system according to claim 1, wherein the the plurality of rod connecting plates are planar or mainly planar.

10. A heating system according to claim 1, wherein at least one side of the slotted holes tongues forms a longitudinal edge of a corresponding slotted hole.

11. A heating system according to claim 10, wherein the tongues are all bent off a plane of the plurality of rod connecting plates on the same side.

12. A heating system according to claim 10, wherein several tongues are successively arranged longitudinally along the plurality of rod connecting plates adjacent to the slotted holes.

13. A heating system according to claim 10, wherein a width of the tongues corresponds approximately to a width of the clamped heating rods.

14. A heating system according to claim 10, wherein the heating rods are of rectangular in shape.

15. A heating system according to claim 1, wherein the plurality of rod connecting plates are made out of sheet metal.

16. A heating system according to claim 15, wherein the sheet metal plates are stamped and bent parts.

17. A heating system according to claim 15, wherein at least one of the sheet metal plates is configured for grounding.

18. A heating system according to claim 17, wherein all of the sheet metal plates are configured for grounding.

19. A heating system according to claim 17, wherein the sheet metal plates are provided with an additional hole for a connecting lug to enable ground connection.

20. An electric heating system for use in automobiles, the system comprising:
- a plurality of side-by-side heating rods; and
- a plurality of connecting plates having a width and a length greater than their width, including at least two slotted holes formed in each plate disposed longitudinally aligned along the length of the connecting plates and configured for receiving the plurality of side-by-side heating rods, the slotted holes having longitudinal edges with tongues configured for clamping the plurality of side-by-side heating rods therebetween, the longitudinal edges extending along the length of the plates, at least some slotted holes having a length being greater than each heating rod width configured for enabling a distance between heating rods to be changed.

21. An electric heating system for use in automobiles, the system comprising:

a plurality of side-by-side heating rods each comprising a rectangular cross-section and each comprising a PTC heating element;

a plurality of rod connecting plates each comprising a series of sequentially aligned slotted holes disposed along a longitudinal length of each of the plurality of rod connecting plates, wherein at least one of the series of sequentially aligned slotted holes comprises a slot length extending along the longitudinal length that is greater than a width of the plurality of side-by-side heating rods; and a plurality of tongues formed along an inside perimeter of each of the series of sequentially aligned slotted holes configured for clamping the rectangular cross-section of the plurality of side-by-side heating rods therebetween.

22. A heating system according to claim 21, wherein the rectangular cross-section of the plurality of side-by-side heating rods comprises a shorter pair of oppositely disposed sides and a longer pair of oppositely disposed sides, wherein the longer pair of oppositely disposed sides are parallel to both the longitudinal length of the plurality of rod connecting plates and to the slot length of the series of sequentially aligned slotted holes.

* * * * *